(12) United States Patent
Joergensen et al.

(10) Patent No.: US 7,669,775 B2
(45) Date of Patent: Mar. 2, 2010

(54) ROOM HEATING SYSTEM

(75) Inventors: Lasse Joergensen, Silkeborg (DK); Lars Dam, Kolding (DK); Jesper Bruhn Hansen, Ribe (DK)

(73) Assignee: Danfoss A/S, Nordborg (DK)

( * ) Notice: Subject to any disclaimer, the term of this patent is extended or adjusted under 35 U.S.C. 154(b) by 1082 days.

(21) Appl. No.: 11/232,024

(22) Filed: Sep. 22, 2005

(65) Prior Publication Data
US 2006/0065754 A1    Mar. 30, 2006

(30) Foreign Application Priority Data
Sep. 24, 2004   (DE)   ............... 10 2004 046 689

(51) Int. Cl.
G05D 23/12   (2006.01)
F24D 19/00   (2006.01)

(52) U.S. Cl. ............... 236/1 C; 236/51; 237/69

(58) Field of Classification Search ............ 236/51, 236/1 C, 91 D, 91 F, 91 R; 700/276; 237/69; 62/331
See application file for complete search history.

(56) References Cited
U.S. PATENT DOCUMENTS 3,665,360 A * 5/1972 Norden ............. 337/100
4,581,522 A * 4/1986 Graham ............. 219/545
4,793,553 A   12/1988 Berman
5,400,964 A    3/1995 Freiberger
6,533,186 B2 * 3/2003 Neve et al. ............. 237/69

FOREIGN PATENT DOCUMENTS

| DE | 3736244 | | 5/1989 |
| DE | 3807021 | | 9/1989 |
| DE | 29716166 | U1 | 10/1997 |
| JP | 56044538 | A * | 4/1981 |
| JP | 59201119 | A * | 11/1984 |
| JP | 02040422 | A * | 2/1990 |
| JP | 05079675 | A * | 3/1993 |
| JP | 07103650 | A * | 4/1995 |
| JP | 2000240951 | A * | 9/2000 |
| JP | 2002267187 | A * | 9/2002 |

OTHER PUBLICATIONS

"Wireless Regulation for Floor Heating" of Danfoss A/S, No. VD. 78. K3. 02, Jan. 2002.

* cited by examiner

*Primary Examiner*—Marc E Norman
(74) *Attorney, Agent, or Firm*—Buchanan, Ingersoll & Rooney PC

(57) ABSTRACT

A room heating system includes a heatable floor having a floor heating system, and a room thermostat having a room air sensor and being connected with a regulating unit for the floor heating system. The temperature control in a room is improved by providing the room thermostat with a surface temperature sensor, which determines a temperature on the surface of the floor from a distance.

20 Claims, 1 Drawing Sheet

ROOM HEATING SYSTEM

FIELD OF THE INVENTION

The invention concerns a room heating system with a heatable floor having a floor heating system, and a room thermostat having a room air sensor and being connected with a regulating unit for the floor heating system.

BACKGROUND OF THE INVENTION

Such a room heating system is, for example, disclosed in the company brochure "Wireless regulation for floor heating" of Danfoss A/S, No. VD.78.K3.02, January 2002. The room thermostat measures the room temperature, and in dependence of the room temperature influences the floor heating system so that the temperature of the room air can be kept substantially constant.

The floor heating system can have different embodiments. Commonly known are, for example, floor heating systems working with a heat carrying medium, for example hot water. In this case, the regulating unit influences the flow of this heat carrying medium through the floor. The floor then acts as heat exchanger, which supplies the heat from the heat carrying medium to the room air.

In another embodiment, the floor heating system can work electrically. For this purpose, resistance heating elements are then inserted in the floor. The regulating device then influences the current, which flows through the resistance heating elements. Also in this case, the floor supplies the increased temperature, which is generated in the resistance heating elements by the flowing current, to the room air.

To many people a room heating via the floor is very comfortable. However, floor heating systems involve problems, which do not occur in connection with radiators. Depending on the nature of the floor used, it is important to have the floor temperature under control. When, for example, a wooden floor is concerned, the temperature must be limited to prevent a drying of the wood and a subsequent damaging of the floor. On the other hand, with a floor covered by tiles, stones or slabs, it is desired to keep a minimum temperature to avoid that a user gets "cold feet".

To determine the floor temperature, a temperature sensor can be built into the floor. In many cases, a hollow space is provided, for example a pipe, in which the temperature sensor can be located. However, with such a location, some regulation problems occur. Due to the inertia of the floor, delays occur in the measuring, so that a regulation takes place too late, which causes an overshoot. Further, the position of the temperature sensor in the floor must be selected very carefully, as the future fitting up of the room can have an influence on the measured temperature. When, for example, a wardrobe is placed exactly over the temperature sensor, the wardrobe will reflect heat back to the floor, which influences the measuring of the floor temperature.

SUMMARY OF THE INVENTION

The invention is based on the task of improving the temperature control in a room.

With a room heating system as mentioned in the introduction, this task is solved in that the room thermostat has a surface temperature sensor, which determines a temperature on the surface of the floor from a distance.

Thus, this surface temperature sensor is a "remote sensor", which can be located at a distance to the floor. This will eliminate practically all the problems involved in bedding the temperature sensor in the floor. Further, the room thermostat is combined with the surface temperature sensor, so that a compact component is achieved. This component is only negligibly or not at all larger than a traditional room thermostat, so that for the user of the room changes are practically not noticeable. Further, also the communication between the regulating unit and the individual sensor, that is, the room air sensor and the surface temperature sensor, is simplified. When these two sensors are located next to each other, it is possible that one single transmission path to the regulating unit will be sufficient. The location of the room thermostat merely has to be chosen so that on the one hand the room thermostat can determine the room air temperature; on the other hand, however, also the surface temperature of the floor. This leaves more freedom for decorating the room, as the structural measures to be taken when locating the surface temperature sensor require substantially less efforts than bedding the temperature sensor in the floor.

Preferably, the surface temperature sensor is an infrared sensor. By means of an infrared sensor, the temperature of the floor surface can be determined relatively exactly, also over a certain distance. Such an infrared sensor is, for example, known from DE 297 16 166 U1. However, here the temperature is not controlled in a closed room, which would be the case according to the present invention.

Preferably, the room thermostat is wirelessly connected with the regulating unit. Thus, no mounting of wires is required to ensure the communication between the room thermostat and the regulating unit. On the contrary, the wireless connection can take place via electromagnetic waves, for example, radio or light. This gives even more flexibility for locating a room thermostat in a room, that is, changes in decorating can be compensated very quickly. It is merely required that the surface temperature sensor can "see" the floor, that is, can perform measuring over a certain distance.

Preferably, the room thermostat gives the surface temperature sensor a priority with regard to influencing the regulating unit. In other words, the influence of the surface temperature sensor on the regulating unit is larger than the influence of the room thermostat sensor. This considers the requirement that the temperature of the floor is a decisive size for influencing the regulating unit.

Preferably, the room thermostat has a minimum/maximum value selection unit for the surface temperature. Thus, it can be selected, if the floor temperature should be limited to a minimum value or a maximum value. When, for example, the floor has a wooden surface, it is desired to set the temperature at a maximum of 25° C. When now assuming that the room temperature shall be 26° C. and the floor temperature is set to 25° C., the floor heating system will supply heat until the floor temperature reaches 25° C. Also when the temperature is lower, for example, only 24° C., for example caused by an open window, no more heat will be supplied, when the floor temperature has reached the maximum limit. When, however, to avoid cold feet, the temperature of a tiled floor in the bathroom is set at at least 27° C. and at the same time the room temperature is set at a lower value, for example 23° C., the floor heating system is only turned off, when at the same time the floor temperature is at least 27° C. This also applies, when the room temperature exceeds its desired value, for example because the sun shines into the room.

Preferably, the room thermostat is located at a height in the range of 1.2 to 1.8 m over the floor. In this height, the room thermostat has the possibility of determining the room air temperature on the one side and the surface temperature of the floor on the other side with a sufficient accuracy, so that the temperature control in the room can be performed with the required reliability.

Preferably, the room thermostat is located at a maximum distance of 0.3 m from a wall. Thus, it interferes very little with decorating the room.

Preferably, the room thermostat determines the surface temperature at certain intervals. Particularly, when the room thermostat is wirelessly connected with the regulating unit, also wires for an energy supply to the room thermostat are undesired. Thus, the room thermostat is supplied from batteries. These should last as long as possible. When the surface temperature of the floor is only determined from time to time, electrical energy for this process will also only be required from time to time. The intervals, at which the surface temperature is determined, may be fixedly preset. However, they can also be chosen freely by the user. Finally, it is also possible to generate these intervals by means of a random generator.

It is preferred that the room thermostat only passes on values of the surface temperature to the regulating unit, when a change exceeds a predetermined value. A relatively large consumption of electrical energy occurs, when the data from the room thermostat are transmitted to the regulating unit. This transmission is only made, when absolutely required. This is only the case, when the values of the surface temperature have changed so that the regulating unit must interfere to maintain or re-establish a desired state.

It may be advantageous that the room thermostat only transmits surface temperature values to the regulating unit, when a medium surface temperature value changes by more than a predetermined value over a predetermined period. For example, four measurings can be made over a period of 15 to 30 minutes. Only when the medium value increases or decreases, this change is transmitted to the regulating unit. Thus, short-term influences, for example from sun radiation, people or animals in the room, are absorbed in such a manner that they cause no additional energy consumption.

BRIEF DESCRIPTION OF THE DRAWINGS

In the following, the invention is described on the basis of a preferred embodiment in connection with the drawings, showing.

DESCRIPTION OF THE PREFERRED EMBODIMENT

Figure 1:
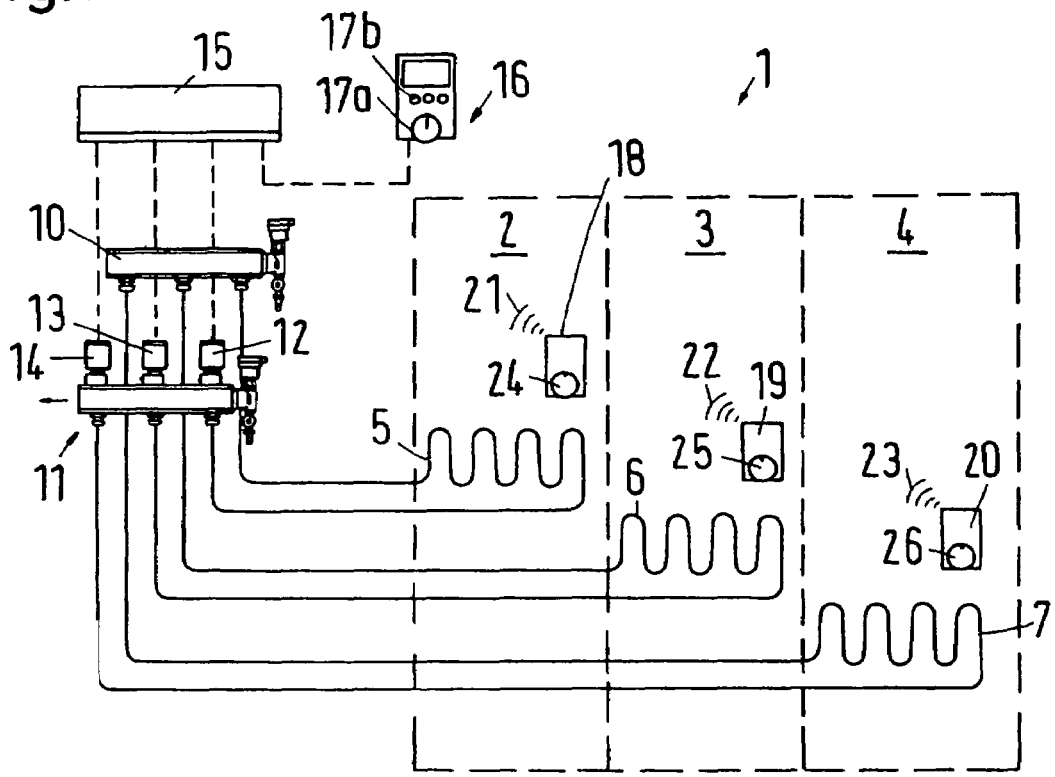
FIG. 1 a schematic view of a heating system with several rooms, and
FIG. 2 a schematic view of a room heating system.

FIG. 1 shows a schematic view of a heating system 1 with three rooms 2, 3, 4, each being provided with a floor heating system 5 to 7. In the present case, each floor heating system 5 to 7 is made as a heating hose, that is, a pipe fitted in a meander-shape, which is fitted in the plaster 8 (FIG. 2) of a floor 9. A heat carrying fluid, for example hot water, then flows through these floor heating systems 5 to 7.

The supply of the floor heating systems 5 to 7 takes place via an inlet connector, to which the floor heating systems 5 to 7 are connected. The control of the heat carrying fluid flowing through the floor heating systems 5 to 7 occurs via a control module 11, to which the floor heating systems 5 to 7 are connected. For each floor heating system, the control module 11 has a controllable valve 12 to 14. Depending on the released opening degree of the valves 12 to 14, a smaller or larger amount of the heat carrying fluid is flowing through the floor heating systems 5 to 7.

The control module 11 is controlled by a control device 15. The control device 15 is connected with a zone control 16, on which certain parameters meant to apply for the whole heating system 1 can be set via setting elements 17a, 17b.

Each room 2 to 4 has a room thermostat 18 to 20, which communicates with the control device 15 via a wireless connection 21 to 23, feeding back, among other things, the actual room temperature, that is, the room air temperature, to the control device 15. A desired room air temperature can be set for each room 2 to 4 via a setting device 24 to 26. The zone control 16 can be used for programming the control device 15.

Figure 2:
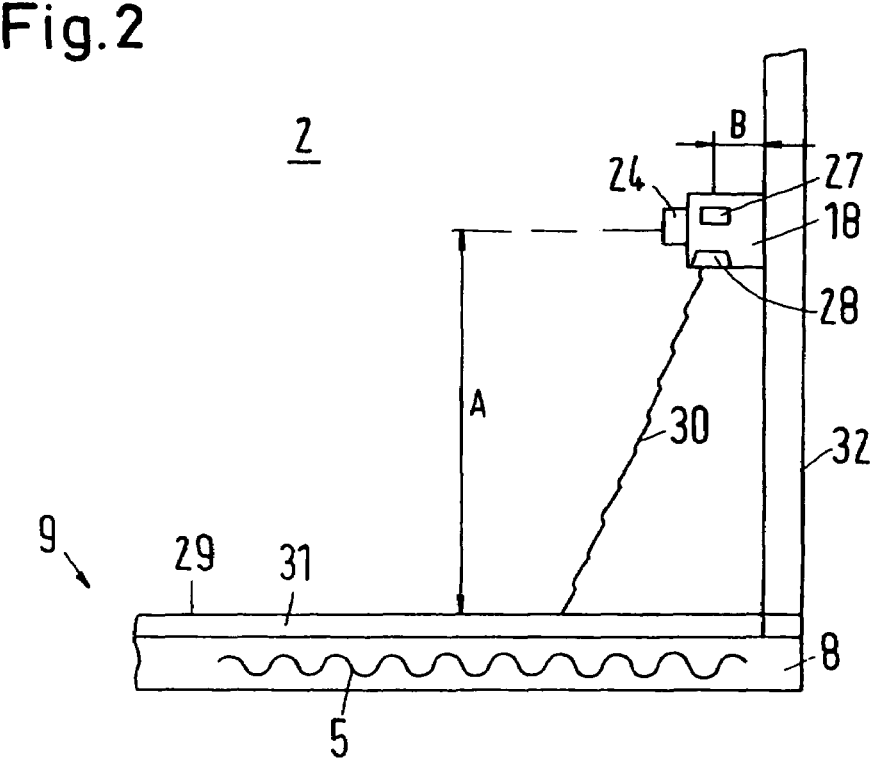

As can be seen from FIG. 2, each room thermostat 18 has, besides the setting device 24, also a room air sensor 27, with which the room air temperature can be determined. Additionally, each room thermostat also has a surface temperature sensor 28, by means of which the temperature at the surface 29 of the floor 9 can be determined. The surface temperature sensor 28 is, for example, an infrared sensor, which receives the heat radiation originating from the surface 29. For this purpose, it is merely required that the surface temperature sensor 28 can "see" the surface 29, that is, a connection by way of radiation is possible.

The fact that the floor 9 temperature is determined directly on the surface 29 results in a faster reaction of the floor heating. When, for example, sunlight reaches the surface 29, a higher temperature will occur here. This can be considered in connection with the supply of the floor heating systems 5 to 7. The same applies for water on the floor, for example when a person leaves the bath or the shower. Until now, it has been necessary to wait for an evaporation, which caused a cooling of the floor, which then had to reach the built-in sensor. In the solution shown here, the water is immediately detected by the surface temperature sensor 28, and a correspondingly fast reaction is possible.

The temperature, which is desired on the floor 9 surface 29, depends on, among other things, a layer 31, which forms the floor 9 surface.

When this layer 31 is made of wood, it is endeavoured not to exceed a predetermined temperature, to prevent a drying of the wooden floor. For example, the temperature on the surface 29 should not exceed 29° C.

When, however the layer 31 consists of tiles or slabs, it is desired to set a certain minimum temperature of, for example, 25° or 27°, so that a user will not get "cold feet" when running around on the floor 9 surface 29.

Accordingly, the room thermostat does not only evaluate the signals of the room air sensor 27, but also the signals of the surface temperature sensor 28. Here, the user can decide if he wants a predetermined minimum value of the surface temperature or a predetermined maximum value of the surface temperature. As stated above, a maximum value, which shall not be exceeded, will, for example, be set for a wooden floor, whereas with a tiled floor a pre-determined minimum temperature is set.

It may now be ensured that the output signals of the surface temperature 28 are treated with a higher priority than the output signals of the room air sensor 27. This setting can be made already in the room thermostat 18, which then prefers the transmission to the zone control 16 of the signals originating from the surface temperature sensor 28. However, this prioriting can also be made in the zone control 16 or even in the control device 15. Together with the control device 15 and the control module 11, the zone control 16 forms a regulating device, which influences the floor heating.

The priority can briefly be explained as follows:
When the layer 31 is of wood, and the desired room temperature is set to 26° C. and the maximum floor temperature to 25° C., the floor heating system 5 is supplied with heat, until the floor temperature reaches 25° C. This is determined by means of the surface temperature sensor 28. When the room temperature drops to 24° C., for example because a window is opened, additional heat will not be supplied, as the temperature of the floor 9 forms the limit.

When, however, the layer 31 consists of tiles, whose temperature shall be at least 27° C., and at the same time the room temperature is set to 23° C., the heat supply is only turned off, when the temperature at the floor 9 surface 29 is at least 27° C., also when an increased sun radiation or several people in the room have caused the room temperature to exceed the predetermined 23° C.

The room thermostat 18 is mounted in a height A in the range from 1.2 to 1.8 m over the floor 9. It has a maximum distance of 0.3 m to a wall 32, on which it is mounted.

The fact that the room thermostat 18 communicates wirelessly with the zone control 16 causes the heating system 1 to be very flexible. There are no problems in reacting to changes of the fitting up of each in individual room 2 to 4. Such a system is also easy to service, as a consumer can easily determine if a room thermostat 18 is defective or not. Typically, such a heating system 1 has several room thermostats 18 to 20, and one of the other room thermostats 18 to 20 can be used to determine if only the individual room thermostat or the complete system is defective. When, for example, it is desired to determine, if the transmission path between the room thermostat 18 and the control device 15 works, a light emission diode and a button, which is provided on the room thermostat 18, can be used. For reasons of clarity, these are not shown here. When the button is pressed, the diode lights up, and the room thermostat 18 will attempt to get in touch with the control device 15. When a communication between these two units is possible, the diode will turn off. The user can then see immediately, if a connection has been established or not.

With a wireless communication between the room thermostat 18 to 20 and the zone control 16, each room thermostat 18 to 20 is supplied with the required electrical power from batteries. In order to ensure the longest possible life of the batteries, it is advantageous, when the room thermostats 18 to 20 do not constantly perform measurings and transmit data.

Therefore, it is ensured that a measuring of the surface temperature is only made at certain intervals. These intervals can be fixedly preset or freely selected. They can also be generated by a random generator. When the measured surface 31 temperature shows no large variations, no data are transmitted to the zone control 16. Also sudden temperature changes, which, for example, occur because of sun radiation or a domestic animal, which lies down under the surface temperature sensor, can be filtered out in a simple manner. To save current, but also to avoid too large variations in the heat supply, not every increase is passed on immediately. On the contrary, it can be attempted to form a medium value over a predetermined number of measurings and merely send information to the zone control 16, when also this medium value reflects a temperature change.

The invention claimed is:

1. A room heating system comprising:
   a heatable floor having a floor heating system; and
   a room thermostat having a room air sensor measuring room air temperature in a room containing the floor heating system, the room air sensor being connected with a regulating unit for the floor heating system, wherein the room thermostat has a surface temperature sensor, which determines a temperature of a surface of the floor at a distance from the floor, and the room thermostat has a minimum/maximum value selection unit for limiting the surface temperature of the floor to a predetermined value irrespective of the room air temperature measured by the room air sensor.

2. The system according to claim 1, wherein the surface temperature sensor is an infrared sensor.

3. The system according to claim 2, wherein the room thermostat is wirelessly connected with the regulating unit.

4. The system according to claim 2, wherein the room thermostat gives the surface temperature sensor a priority with regard to influencing the regulating unit.

5. The system according to claim 2, wherein the room thermostat is located at a height in the range of 1.2 to 1.8 m over the floor.

6. The system according to claim 2, wherein the room thermostat is located at a maximum distance of 0.3 m from a wall.

7. The system according to claim 2, wherein the room thermostat determines the surface temperature of the floor at certain time intervals.

8. The system according to claim 7, wherein the room thermostat only passes on values of the surface temperature sensor to the regulating unit when a change exceeds a predetermined value.

9. The system according to claim 8, wherein the room thermostat only transmits the surface temperature values to the regulating unit when a medium surface temperature value changes by more than a predetermined value over a predetermined period.

10. The system according to claim 7, wherein the room thermostat only transmits surface temperature values from the surface temperature sensor to the regulating unit when a medium surface temperature value changes by more than a predetermined value over a predetermined period.

11. The system according to claim 1, wherein the room thermostat is wirelessly connected with the regulating unit.

12. The system according to claim 1, wherein the room thermostat gives the surface temperature sensor a priority with regard to influencing the regulating unit.

13. The system according to claim 1, wherein the room thermostat is located at a height in the range of 1.2 to 1.8 m over the floor.

14. The system according to claim 1, wherein the room thermostat is located at a maximum distance of 0.3 m from a wall.

15. The system according to claim 1, wherein the room thermostat determines the surface temperature of the floor at certain time intervals.

16. The system according to claim 15, wherein the room thermostat only passes on values of the surface temperature sensor to the regulating unit when a change exceeds a predetermined value.

17. The system according to claim 16, wherein the room thermostat only transmits the surface temperature values to the regulating unit when a medium surface temperature value changes by more than a predetermined value over a predetermined period.

18. The system according to claim 15, wherein the room thermostat only transmits surface temperature values from the surface temperature sensor to the regulating unit when a medium surface temperature value changes by more than a predetermined value over a predetermined period.

19. The system according to claim 1, wherein the room thermostat and the surface temperature sensor are included in a single component.

20. The system according to claim 19, wherein the single component is adapted to be mounted on a wall.

* * * * *